US011281690B1

(12) United States Patent
Smyk et al.

(10) Patent No.: US 11,281,690 B1
(45) Date of Patent: Mar. 22, 2022

(54) DYNAMIC IDENTIFICATION AND RETRIEVAL OF CONNECTION STRINGS

(71) Applicant: Amazon Technologies, Inc., Reno, NV (US)

(72) Inventors: Andrei Smyk, Hayward, CA (US); Jack Lee Knutson, Shenzhen (CN); Cornell Tyrone Gassaway, Cupertino, CA (US)

(73) Assignee: AMAZON TECHNOLOGIES, INC., Seattle, WA (US)

(*) Notice: Subject to any disclaimer, the term of this patent is extended or adjusted under 35 U.S.C. 154(b) by 1098 days.

(21) Appl. No.: 13/779,506

(22) Filed: Feb. 27, 2013

(51) Int. Cl.
*G06F 16/27* (2019.01)

(52) U.S. Cl.
CPC .................................. *G06F 16/27* (2019.01)

(58) Field of Classification Search
CPC ..................................................... G06F 16/27
See application file for complete search history.

(56) References Cited

U.S. PATENT DOCUMENTS

2006/0179347 A1* 8/2006 Anderson et al. .............. 714/16
2008/0098003 A1* 4/2008 Dias et al. ...................... 707/10
2008/0104083 A1* 5/2008 Woods ............................ 707/10
2008/0147595 A1* 6/2008 Rjaibi ............................. 707/2
2009/0125632 A1* 5/2009 Purpura .................. H04L 63/10 709/229
2011/0093937 A1* 4/2011 Mantle et al. .................... 726/6
2012/0284296 A1* 11/2012 Arifuddin et al. ............ 707/769
2012/0330899 A1* 12/2012 Luo ..................... G06F 11/1482 707/683
2013/0254857 A1* 9/2013 Bajenov ................ H04L 63/083 726/7
2014/0181311 A1* 6/2014 Hussein ................ H04L 67/141 709/227

* cited by examiner

*Primary Examiner* — Mariela Reyes
*Assistant Examiner* — James E Heffern
(74) *Attorney, Agent, or Firm* — Eversheds Sutherland (US) LLP

(57) ABSTRACT

A first database system may receive an access request from a connector module associated with a client application. The access request may include one or more access credentials for accessing a database associated with the first database system. The connector module may transmit one or more access parameters to the first database system. A connection string may be dynamically identified based on the access parameters. The connection string may be transmitted to the connector module, and may be used to establish a connection between the client application and the second database system. The connector module may also provide fallback capability for establishing a connection with a standby database server when a primary database server is unavailable such that open transactions are halted during the transitioning of the connection and resumed thereafter without having to abort the transactions.

21 Claims, 6 Drawing Sheets

DYNAMIC IDENTIFICATION AND RETRIEVAL OF CONNECTION STRINGS

BACKGROUND

In conventional systems, connection strings that enable connections to be established between client applications and a server, such as a database server, are typically stored at endpoints on which the client applications are executing. More specifically, in conventional systems, connection strings may be stored in a system registry of an endpoint or in a configuration file. As new database servers are introduced, updates must be made at each connecting endpoint in order to store additional connection strings for establishing connections to the new database servers which may involve considerable time and expense. Further, storage of connection strings at endpoints creates security vulnerabilities.

BRIEF DESCRIPTION OF THE DRAWINGS

The detailed description is set forth with reference to the accompanying drawings. In the drawings, the left-most digit(s) of a reference numeral identifies the drawing in which the reference numeral first appears. The use of the same reference numerals indicates similar or identical components; however, different reference numerals may be used to identify similar or identical components as well. Various embodiments may utilize element(s) and/or component(s) other than those illustrated in the drawings and some element(s) and/or component(s) may not be present in various embodiments. The use of singular terminology to describe a component or element may, depending on the context, encompass a plural number of such components or elements and vice versa.

DETAILED DESCRIPTION

Overview

Figure 1A:
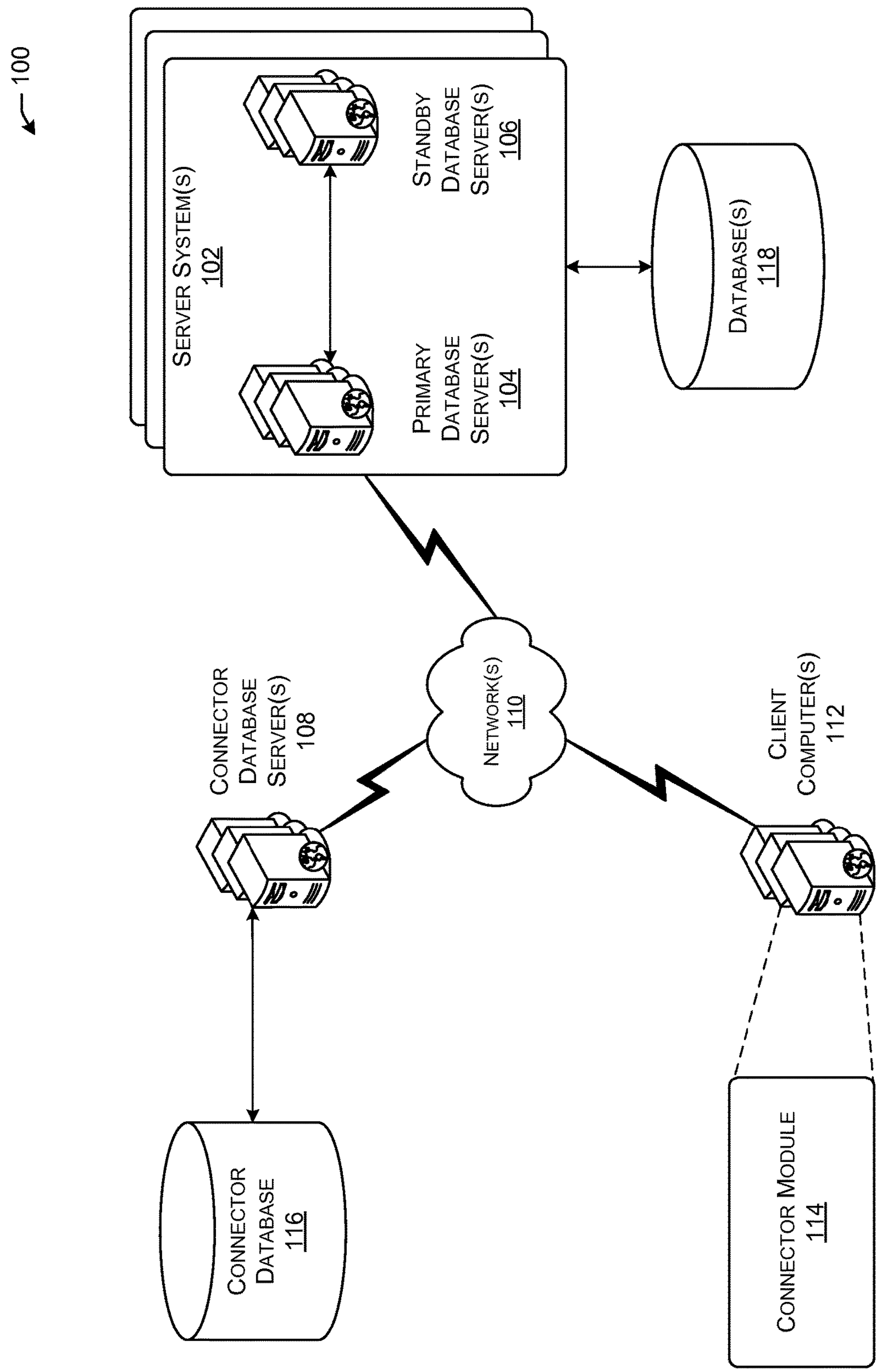
FIG. 1A is a schematic diagram of an illustrative system architecture in accordance with one or more embodiments of the disclosure.

This disclosure relates to, among other things, systems, methods, computer-readable media, techniques, and methodologies for dynamically identifying and providing a connection string upon receipt of an access request. The connection string may enable a connection to be established between a client application executing on a client computing device and a server device such as a database server. The access request for accessing a database server may be transmitted from a module (which may be referred to herein as a connector module) that is associated with the client application to a server associated with a database that stores connection strings for establishing connections between various client applications and corresponding database servers. The database that stores connection strings and facilitates dynamic identification of a connection string upon receipt of an access request may be referred to herein as a connector database and the server associated with the connector database may be referred to herein as a connector database server. The term "database" as used herein encompasses any datastore that stores information and from which information may be accessed or retrieved.

The connector module may include any suitable combination of hardware, software, and/or firmware. The connector module may form part of one or more client applications or may be distinct therefrom. The connector module may be provided on a client computing device on which a client application is executing or on a different device that is configured to communicate with the client computing device and the client application. In certain embodiments, the connector module may be provided on the connector database server. Further, in certain embodiments, a respective connector module may be provided in association with each of multiple client applications. In other embodiments, a single connector module may be provided in association with multiple client applications. The connector module may include or otherwise be associated with one or more access credentials for accessing the connector database via, for example, the connector database server. The access credentials may be of any suitable type and may include, for example, a user name and password for accessing the connector database.

The connector module may include computer-executable instructions for identifying the access credentials. The access credentials may provide a capability to execute a subroutine (e.g., a stored procedure) on the connector database. For example, the connector module may utilize the access credentials to establish a connection with the connector database server. The connector module may then be provided with privileges to execute a stored procedure on the connector database. The stored procedure may receive various access parameters via the connector module. The access parameters may include, but are not limited, a site identifier associated with a site at which the client application is deployed, an identifier associated with the client application, authentication credentials associated with a user of the client application, and so forth. For example, the site identifier may include a site name, the identifier associated with the client application may include a name of the client application, and so forth. The authentication credentials associated with a user of the client application may include, for example, a user name and password utilized by the user to gain access to the computing device, domain or platform on which the client application is executing.

The stored procedure may be executed based at least in part on the access parameters received from the connector module. Execution of the stored procedure may include identifying a database server with which the requesting client application is associated and identifying an associated connection string for establishing a connection between the client application and the identified database server. In certain embodiments, particular database server(s) may be associated with particular client application(s). Further, in various embodiments, an association between particular database server(s) and particular client application(s) may be based at least in part on a geographical region associated with a client application. For example, particular database server(s) may be designated as being associated with client applications that are deployed at sites within a particular geographical region.

Upon identification of a database server with which the client application is associated, an associated connection string for establishing a connection between the client application and the identified database server may be identified. The connection string may include information that identifies the database server, one or more databases that the database server provides access to, as well as authentication credentials for accessing the database server such as a user name and password. In various embodiments, the connection string may be identified via, for example, a lookup performed on a table stored in the connector database. In other embodiments, identifying the connection string may involve dynamically generating the connection string based at least in part on receipt of the access request and execution of the stored procedure. It should be appreciated that numerous mechanisms for identifying the connection string are within the scope of this disclosure.

Upon identification of the connection string, the connection string may be provided by the connector database server to the connector module. In certain embodiments, execution of the stored procedure may return the connection string to the connector module. Upon receipt of the connection string, the connector module may facilitate the establishment of a connection between the client application and the database server identified by the connection string. According to embodiments of the disclosure, a connection string is dynamically fetched from a connector database based at least in part on access credentials that provide the connector module with access to a connector database. Thus, in accordance with embodiments of the disclosure, connection strings are not stored at endpoints on which client applications are executing thereby providing improved system scalability. Because connection strings are not stored, for example, in a system registry or configuration file at an endpoint, as additional database servers are provided, connection strings to such additional database servers may be dynamically fetched from the connector database without requiring modifications or updates to be made at the endpoint. Thus, the considerable time and expense of having to update each endpoint as the system is scaled is avoided.

In addition, embodiments of the disclosure provide increased security over conventional systems because connection strings are not stored at the endpoints and thus cannot be compromised. Further, even if the access credentials stored in or otherwise provided in association with the connector module are compromised, such access credentials provide privileges for executing a stored procedure or other subroutine on the connector database and dynamically fetching an associated connection string but do not permit access to other connection strings stored in the connector database. In addition, if the access credentials are compromised, the access credentials may be modified to prevent illegitimate attempts to access a database server. Further, monitoring data associated with access requests may be generated and analyzed to determine whether the data is indicative of abnormal activity patterns that may indicate that authentication credentials used to access a computing device, domain or platform on which a client application is executing have been compromised. If it is determined that such authentication credentials have potentially been compromised, access requests associated with those authentication credentials may be denied. For example, the connector database may prohibit the fetching of connection strings for access requests associated with authentication credentials determined to have been compromised. In addition, in certain embodiments, the connector module may generate event data associated with one or more events. The one or more events may include, for example, one or more database accesses by a client application connected to a database server. The database accesses may include, for example, SQL statements executed on database(s) associated with the database server. The event data may be utilized by other client applications in any suitable manner such as, for example, to generate report data.

This disclosure also relates to, among other things, systems, methods, computer-readable media, techniques, and methodologies for providing a fallback capability that permits transactions with a primary database server to be halted upon termination of a connection with the primary database server and resumed upon establishing a connection with a standby database server. Information stored in one or more databases associated with the primary database server may be replicated on one or more databases associated with the standby database server.

A connection may be established between a primary database server and a client application based, for example, on a connection string dynamically fetched via the connector database as described above. The connector module may receive an indication of a termination of a connection between the client application and the primary database server. The connection may be terminated based, for example, on a failure or fault condition associated with the primary database server, maintenance being performed on the primary database server, and so forth. Upon receipt of this indication, the connector module may halt pending transactions between the client application and the primary database server. As used herein, the term "transaction" may refer to any request to access information from or store information in one or more databases associated with a database server. The connector module may then periodically poll the primary database server to determine if a connection may be re-established between the client application and the primary database server. If the connector module determines that a connection cannot be re-established with the primary database server, the connector module may poll the standby database server to determine if a connection can be established between the client application and the standby database server. If the connector module determines that a connection can be established between the client application and the standby database server, the connector module may proceed to facilitate establishment of the connection and may resume the previously halted transactions with the standby database server instead of the primary database server.

The determination as to whether a connection can be established between a client application and a particular database server may be based at least in part on an indicator stored on the database server and/or whether an attempted connection with the database server times out. For example, upon polling a database server, a stored procedure provided on the database server may be executed. The stored procedure may return a Boolean value indicating whether a connection can be established with the database server. Alternatively, if a database server is polled and the connection times out after some period of time, this may indicate that the database server is not available. As a non-limiting example, the connector module may poll the primary database server to determine whether a connection can be established. If the primary database server is down as a result of a failure or fault condition, maintenance, or some other reason, the attempted connection with the primary database server may time out. The connector module may then poll the standby database server to determine if a connection can be established with the standby database server. If the primary database server is unavailable for connection, the stored procedure on the standby database server may be modified to return a Boolean value (e.g., a Boolean true) indicating that a connection can be established with the standby database server, and in this manner, the standby database server may be designated to serve (at least temporarily) as the primary database server. Thus, upon polling the standby database server, the stored procedure may be executed and return an indication (e.g., a Boolean true value) that a connection can be established with the standby database server, upon receipt of which the connector module may establish a connection with the standby database server.

If the primary database server is once again returned to a functioning state, the Boolean values returned by the stored procedures respectively provided on the database servers may be reversed, the connection with the standby database server (serving temporarily as the primary database server) may be terminated and associated transactions halted, and the connector module may poll the primary database server and determine that a connection may once again be established with the primary database server. Upon re-establishing the connection with the primary database server, the halted transactions may be resumed with the primary database server instead of the standby database server. The fallback capability provided by the connector module and described above allows open transactions between a client application and a database server to be halted and resumed without having to abort the transactions.

The embodiments described above as well as additional embodiments of the disclosure will be described in greater detail below through reference to the accompanying drawings.

Illustrative Architecture

FIG. 1A is a schematic diagram of an illustrative system architecture 100 in accordance with one or more embodiments of the disclosure. The system architecture 100 may include one or more server systems 102, one or more connector database servers 108, and one or more client computer(s) 112. While various components may at times be referred to herein in the singular, it should be appreciated that embodiments of the disclosure encompass a plural number of such components and vice versa. The server system(s) 102, the connector database server(s) 108, and/or the client computer(s) 112 may be configured to communicate with one another via one or more networks 110. The network(s) 110 may include, but are not limited to, any one or a combination of different types of suitable communications networks, such as cable networks, the Internet, wireless networks, cellular networks, or any other private and/or public networks. Further, the network(s) 110 may include any type of medium over which network traffic may be carried including, but not limited to, coaxial cable, twisted wire pair, optical fiber, hybrid fiber coaxial (HFC), microwave terrestrial transceivers, radio frequency communications, satellite communications, or combinations thereof.

The server system 102 may include one or more primary database servers 104 and one or more standby database servers 106. The primary database server 104 and the standby database server 106 may each be associated with one or more databases 118. In certain embodiments, a respective one or more of the databases 118 may be stored on the each of the primary database server 104 and the standby database server 106. In other embodiments, certain of the database(s) 118 may be provided externally to the primary database server 104 and/or the standby database server 106, and the primary database server 104 and/or the standby database server 106 may be configured to access the external databases. Data stored on database(s) 118 associated with the primary database server 104 may be replicated on database(s) 118 associated with the standby database server 106.

Whether a particular database server of the server system 102 serves as a primary database server 104 or a standby database server 106 may be determined based on various factors. For example, if a database server designated as the primary database server 104 becomes unable to support desired functionality due to a failure condition, maintenance, or the like, a connection between a client application and the primary database server 104 may be terminated, the standby database server 106 may be designated as the primary database server, and a connection between the client application and the standby database server 106 (now acting as the primary database server 104) may be established and maintained at least until the primary database server 104 once again becomes available.

The connector database server 108 may facilitate access to a connector database 116. The connector database 116 may store various connection strings for enabling connections between various client applications and various server systems 102. In various embodiments, the connector database 116 may be form part of the connector database server 108 (e.g., the connector database 116 may be loaded into memory of the connector database server 108).

The client computer 112 may include a connector module 114. The connector module 114 may include any suitable combination of hardware, software, and/or firmware. The connector module 114 may be stored in the client computer 112 (loaded for example into a memory of the client computer 112) and may form part of one or more client applications. In other embodiments, the connector module 114 may be loaded into a memory of the client computer 112 but may be distinct from any client applications executing on the client computer 112. In still other embodiments, the connector module 114 may be provided in connection with a device or devices distinct from the client computer 112 such as the connector database server 108 but may nonetheless be configured to communicate with the client computer 112 and client applications executing on the client computer 112. In certain embodiments, a respective connector module 114 may be provided in association with each of multiple client applications. In other embodiments, a single connector module 114 may be provided in association with multiple client applications. It should be appreciated that numerous other architectural configurations for providing the connector module 114 are within the scope of this disclosure.

The connector module 114 may include or otherwise be associated with one or more access credentials for accessing the connector database 116 via, for example, the connector database server 108. The access credentials may be of any suitable type and may include, for example, a user name and password for accessing the connector database 116. The connector module 114 may include computer-executable instructions for identifying the access credentials. The access credentials may provide a capability to execute a subroutine (e.g., a stored procedure) on the connector database 116. For example, the connector module 114 may utilize the access credentials to establish a connection with the connector database server 108 as part of an access request on behalf of a client application to establish a connection between the client application and a database server. Based on the access credentials, the connector module 114 may be provided with privileges to execute a stored procedure on the connector database 116. The connector module 114 may include computer-executable instructions for identifying various access parameters, and the stored procedure may receive the access parameters via the connector module 114. The access parameters may include any of those previously described.

The stored procedure may be executed by on the connector database 116 based at least in part on the access parameters received from the connector module 114. Execution of the stored procedure may include identifying a database server system 102 (or more specifically a database server such as the primary database server 104 or the standby database server 106) with which the requesting client application is associated and identifying a connection string for establishing a connection between the client application and the identified database server. As previously noted, in certain embodiments, particular database server(s) may be associated with particular client application(s). For example, an association between particular database server(s) and particular client application(s) may be based at least in part on a geographical region associated with a client application.

Upon identification of a database server with which the client application is associated, a connection string for establishing a connection between the client application and the identified database server may be identified. The connection string may include information that identifies the database server, one or more databases that the database server controls access to, as well as authentication credentials for accessing the database server such as a user name and password. In certain embodiments, the connection string may be identified via, for example, a lookup performed on a table stored in the connector database 116. In various other embodiments, identifying the connection string may include dynamically generating the connection string based at least in part on receipt of the access request and execution of the stored procedure.

Upon identification of the connection string, the connection string may be provided by the connector database server 108 to the connector module 114. Upon receipt of the connection string, the connector module 114 may facilitate the establishment of a connection between the client application and the database server identified by the connection string. In certain embodiments, the connection string may be provided to the requesting client application which may then utilize the connection string to establish a connection with the database server identified by the connection string.

Further, as previously noted, the connector module 114 may be configured to provide a fallback capability that permits transactions with the primary database server 104 to be halted upon termination of a connection with the primary database server 104 and resumed upon establishing a connection with the standby database server 106. Thus, the standby database server 106 may serve as a proxy for the primary database server. The connection with the primary database server 104 may be terminated for any number of reasons such as a failure or fault condition associated with the primary database server 104, maintenance performed on the primary database server 104, and so forth. If the primary database server 104 is once again returned to a functioning state, the connection with the standby database server 106 (serving temporarily as the primary database server) may be terminated and associated transactions halted, and the connector module 114 may poll the primary database server 104 and determine that a connection may once again be established with the primary database server 104. Upon re-establishing the connection with the primary database server 104, the halted transactions may be resumed with the primary database server 104 in lieu of the standby database server 106.

Figure 1B:
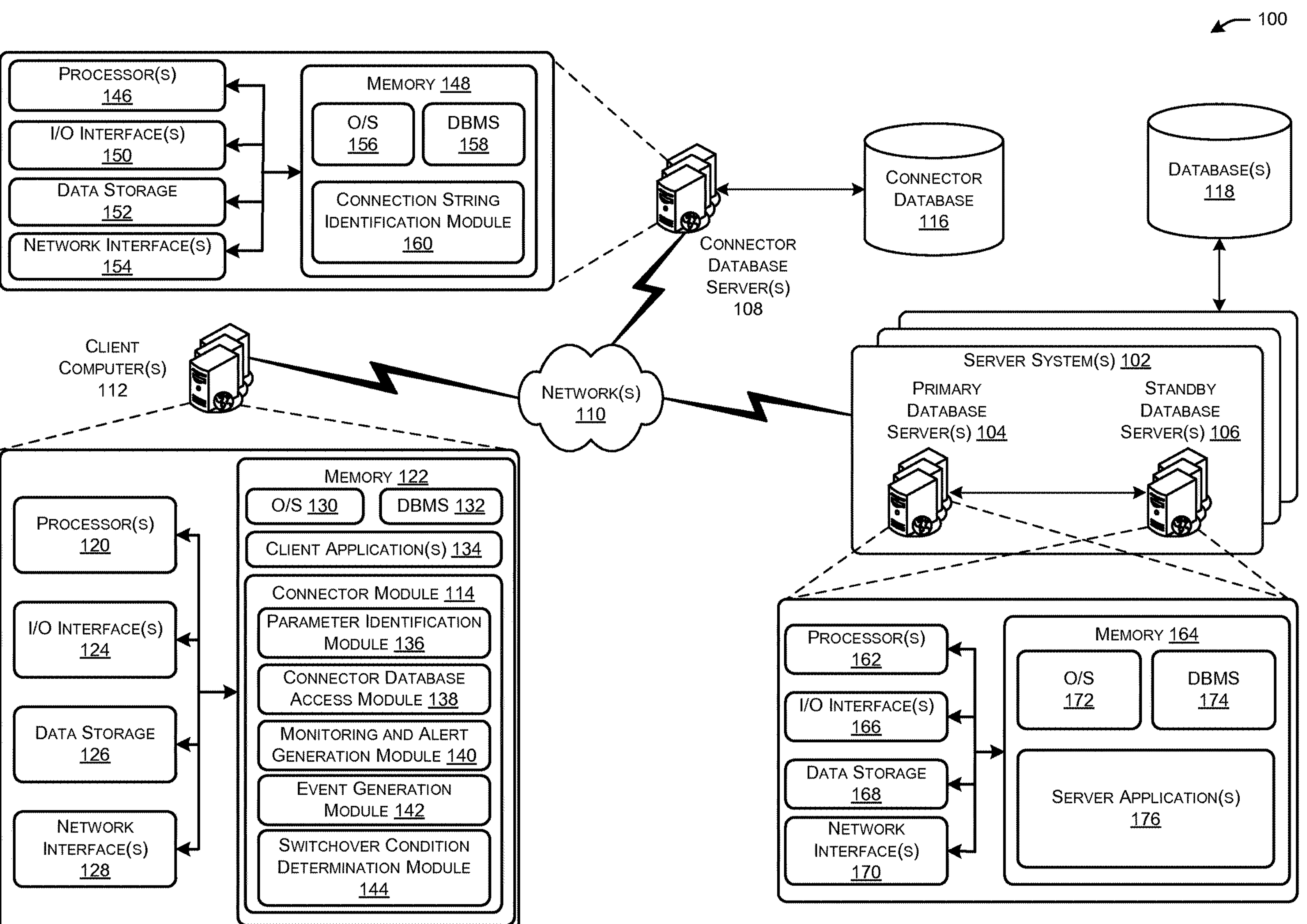
FIG. 1B is a schematic diagram depicting illustrative components of the system architecture depicted in FIG. 1 in accordance with one or more embodiments of the disclosure.
Figure 2:
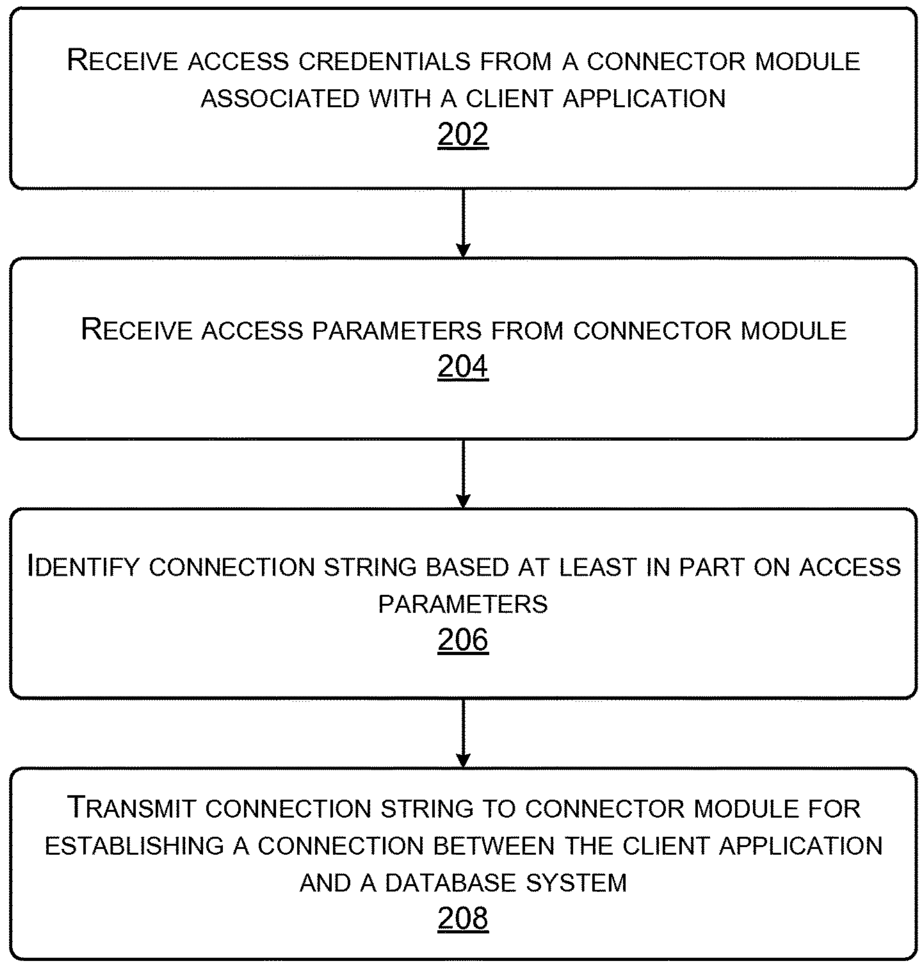
FIG. 2 is a process flow diagram of an illustrative method for dynamically identifying and providing a connection string in accordance with one or more embodiments of the disclosure.

FIG. 1B is a schematic diagram depicting the illustrative components of the system architecture 100 of FIG. 1A in more detail in accordance with one or more embodiments of the disclosure. The primary database server 104, the standby database server 106, the connector database server 108, and the client computer 112 are depicted as included various illustrative hardware and software components. It should be appreciated that the various hardware and software components depicted in FIG. 2 are merely illustrative and that, in some embodiments, all depicted components may not be present while in other embodiments additional components may be present. Further, functionality described as being provided by a particular component may, in various embodiments, be provided by one or more other depicted components or by additional components not depicted. In addition, any of the depicted components may support additional functionality beyond that which has been described. Moreover, while various program modules have been depicted as being loaded into memory, it should be appreciated that functionality described as being supported or implemented by the program modules may be facilitated by any combination of hardware, software, and/or firmware.

The client computer 112 may illustratively include one or more processors (processor(s)) 120 and one or more memories 122 (generically referred to herein as memory 122). The processor(s) 120 may include any suitable processing unit capable of accepting digital data as input, processing the input data based on stored computer-executable instructions, and generating output data. The computer-executable instructions may be stored, for example, in the at least one memory 122 and may include, for example, operating system software and application software. The processor(s) 120 may be configured to execute the computer-executable instructions to cause various operations to be performed. The processor(s) 120 may include any type of processing unit including, but not limited to, a central processing unit, a microprocessor, a microcontroller, a Reduced Instruction Set Computer (RISC) microprocessor, an Application Specific Integrated Circuit (ASIC), a System-on-a-Chip (SoC), a field-programmable gate array (FPGA), and so forth.

The memory 122 may store program instructions that are loadable and executable by the processor(s) 120 as well as data manipulated and/or generated by the processor(s) 120 during execution of the program instructions. Depending on the configuration and implementation of the client computer 112, the memory 122 may be volatile memory (memory that is not configured to retain stored information when not supplied with power) such as random access memory (RAM) and/or non-volatile (memory that is configured to retain stored information even when not supplied with power) such as read-only memory (ROM), flash memory, and so forth. In various implementations, the memory 122 may include multiple different types of memory, such as static random access memory (SRAM), dynamic random access memory (DRAM), unalterable ROM, and/or writeable variants of ROM such as electrically erasable programmable read-only memory (EEPROM), flash memory, and so forth.

The client computer 112 may further include additional data storage 126 such as removable storage and/or non-removable storage including, but not limited to, magnetic storage, optical disk storage, and/or tape storage. Data storage 126 may provide storage of computer-executable instructions and other data. The data storage 126 may include storage that is internal and/or external to the client computer 112. The memory 122 and/or the data storage 126, removable and/or non-removable, are examples of computer-readable storage media (CRSM).

The client computer 112 may further include network interface(s) 128 that allow the client computer 112 to communicate with other computing devices or application software forming part of the networked architecture 100. For example, the client computer 112 may utilize the network interface(s) 128 to communicate with the connector database server 108 (and thus the connector database 116) and one or more of the server system(s) 102 via the network(s) 110.

The client computer 112 may additionally include input/output (I/O) interface(s) 124 (and optionally associated software components such as device drivers) that may support a various I/O devices, such as a keyboard, a mouse, a pen, a voice input device, a touch input device, a display, speakers, a camera, a microphone, a printer, and so forth, for receiving user input and/or providing output to a user.

The memory 122 may include various program modules comprising computer-executable instructions that upon execution by the processor(s) 120 may cause various operations to be performed. For example, the memory 122 may have loaded therein an operating system (O/S) 130 that provides an interface between other application software executing on the client computer 112 and hardware resources of the client computer 112. More specifically, the O/S 130 may include a set of computer-executable instructions for managing hardware resources of the client computer 112 and for providing common services to other application programs (e.g., managing memory allocation among various application programs). The O/S 130 may include any operating system now known or which may be developed in the future including, but not limited to, any desktop or laptop operating system, any mobile operating system, any mainframe operating system, or any other proprietary or freely available operating system. The memory 122 may further include a database management system (DBMS) 132 for accessing, retrieving, storing, and/or manipulating data stored in one or more databases (e.g., the connector database 116 and/or one or more of the database(s) 118). The DBMS 132 may use any of a variety of database models (e.g., relational model, object model, etc.) and may support any of a variety of query languages.

The memory 122 may further include various program modules comprising computer-executable instructions that upon execution by the processor(s) 120 may cause various operations to be performed. For example, the memory 122 may have loaded therein one or more client applications 134. Further, the memory 122 may have loaded therein the connector module 114. As previously described, the connector module 114 may facilitate receipt of connection strings from the connector database 116 for establishing connections between the client application(s) 134 and various server system(s) 102 (or more specifically various primary database server(s) 104 and/or standby database server(s) 106). The client application(s) 134 may be any suitable application(s) configured to interact with a database server. While the connector module 114 is illustratively depicted as being loaded into the memory 122 of the client computer 112, it should be appreciated that the connector module 114 may be provided externally to the client computer 112 (and configured to interact with the client computer 112) or in accordance with any other suitable architectural configuration.

The connector module 114 may include various program sub-modules such as a parameter identification module 136, a connector database access module 138, a monitoring and alert generation module 140, an event generation module 138, and/or a switchover condition determination module 144. Each of these sub-modules may include computer-executable instructions that upon execution by the processor(s) 120 may cause various operations to be performed.

Referring now to the connector database server 108, the connector database server 108 may illustratively include one or more processors (processor(s)) 146 and one or more memories 148 (generically referred to herein as memory 148). The processor(s) 146 may include any suitable processing unit capable of accepting digital data as input, processing the input data based on stored computer-executable instructions, and generating output data. The computer-executable instructions may be stored, for example, in the at least one memory 148 and may include, for example, operating system software and application software. The processor(s) 146 may be configured to execute the computer-executable instructions to cause various operations to be performed. The processor(s) 146 may include any type of processing unit including, but not limited to, a central processing unit, a microprocessor, a microcontroller, a Reduced Instruction Set Computer (RISC) microprocessor, an Application Specific Integrated Circuit (ASIC), a System-on-a-Chip (SoC), a field-programmable gate array (FPGA), and so forth.

The memory 148 may store program instructions that are loadable and executable by the processor(s) 146 as well as data manipulated and/or generated by the processor(s) 146 during the execution of the program instructions. Depending on the configuration and implementation of the connector database server 108, the memory 148 may be volatile memory (memory that is not configured to retain stored information when not supplied with power) such as random access memory (RAM) and/or non-volatile (memory that is configured to retain stored information even when not supplied with power) such as read-only memory (ROM), flash memory, and so forth. In various implementations, the memory 148 may include multiple different types of memory, such as static random access memory (SRAM), dynamic random access memory (DRAM), unalterable ROM, and/or writeable variants of ROM such as electrically erasable programmable read-only memory (EEPROM), flash memory, and so forth.

The connector database server 108 may further include additional data storage 152 such as removable storage and/or non-removable storage including, but not limited to, magnetic storage, optical disk storage, and/or tape storage. Data storage 152 may provide storage of computer-executable instructions and other data. The data storage 152 may include storage that is internal and/or external to the connector database server 108. The memory 148 and/or the data storage 152, removable and/or non-removable, are examples of computer-readable storage media (CRSM).

The connector database server 108 may further include network interface(s) 154 that allow the connector database server 108 to communicate with other computing devices or application software forming part of the networked architecture 100. For example, the connector database server 108 may utilize the network interface(s) 154 to communicate with the client computer 112 (or more specifically the connector module 114) via the network(s) 110.

The connector database server 108 may additionally include input/output (I/O) interface(s) 150 (and optionally associated software components such as device drivers) that may support a various I/O devices, such as a keyboard, a mouse, a pen, a voice input device, a touch input device, a display, speakers, a camera, a microphone, a printer, and so forth, for receiving user input and/or providing output to a user.

The memory 148 may include various program modules comprising computer-executable instructions that upon execution by the processor(s) 146 may cause the various operations to be performed. For example, the memory 148 may have loaded therein an operating system (O/S) 156 that provides an interface between other application software executing on the connector database server 108 and hardware resources of the connector database server 108. More specifically, the O/S 156 may include a set of computer-executable instructions for managing hardware resources of the connector database server 108 and for providing common services to other application programs (e.g., managing memory allocation among various application programs). The O/S 156 may include any operating system now known or which may be developed in the future including, but not limited to, any desktop or laptop operating system, any mobile operating system, any mainframe operating system, or any other proprietary or freely available operating system. The memory 148 may further include a database management system (DBMS) 158 for accessing, retrieving, storing, and/or manipulating data stored in one or more databases (e.g., the connector database 116). The DBMS 158 may use any of a variety of database models (e.g., relational model, object model, etc.) and may support any of a variety of query languages.

The memory 148 may further include various program modules comprising computer-executable instructions that upon execution by the processor(s) 146 may cause various operations to be performed. For example, the memory 148 may include a connection string identification module 160 that includes computer-executable instructions for identifying and providing a connection string to the connector module 114 based on receipt of an access request from the connector module 114, where the connection string facilitates establishment of a connection between a client application 130 and a database server (e.g., the primary database server 104 of a particular server system 102).

Referring now to the server system 102, the server system 102 may include one or more primary database servers 104 and one or more standby database servers 106. Each of the primary database server 104 and the standby database server 106 (which may be referred to in the following discussion generically as the "database server") may illustratively include one or more processors (processor(s)) 162 and one or more memories 164 (generically referred to herein as memory 164). The processor(s) 162 may include any suitable processing unit capable of accepting digital data as input, processing the input data based on stored computer-executable instructions, and generating output data. The computer-executable instructions may be stored, for example, in the at least one memory 164 and may include, for example, operating system software and application software. The processor(s) 162 may be configured to execute the computer-executable instructions to cause various operations to be performed. The processor(s) 162 may include any type of processing unit including, but not limited to, a central processing unit, a microprocessor, a microcontroller, a Reduced Instruction Set Computer (RISC) microprocessor, an Application Specific Integrated Circuit (ASIC), a System-on-a-Chip (SoC), a field-programmable gate array (FPGA), and so forth.

The memory 164 may store program instructions that are loadable and executable by the processor(s) 162 as well as data manipulated and/or generated by the processor(s) 162 during execution of the program instructions. Depending on the configuration and implementation of the database server, the memory 164 may be volatile memory (memory that is not configured to retain stored information when not supplied with power) such as random access memory (RAM) and/or non-volatile (memory that is configured to retain stored information even when not supplied with power) such as read-only memory (ROM), flash memory, and so forth. In various implementations, the memory 164 may include multiple different types of memory, such as static random access memory (SRAM), dynamic random access memory (DRAM), unalterable ROM, and/or writeable variants of ROM such as electrically erasable programmable read-only memory (EEPROM), flash memory, and so forth.

The database server may further include additional data storage 168 such as removable storage and/or non-removable storage including, but not limited to, magnetic storage, optical disk storage, and/or tape storage. Data storage 168 may provide storage of computer-executable instructions and other data. The data storage 168 may include storage that is internal and/or external to the database server. The memory 164 and/or the data storage 168, removable and/or non-removable, are examples of computer-readable storage media (CRSM).

The database server may further include network interface(s) 170 that allow the database server to communicate with other computing devices or application software forming part of the networked architecture 100. For example, the database server may utilize the network interface(s) 170 to communicate with the client computer 112 (or more specifically one or more of the client application(s) 134) via the network(s) 110.

The database server may additionally include input/output (I/O) interface(s) 166 (and optionally associated software components such as device drivers) that may support a various I/O devices, such as a keyboard, a mouse, a pen, a voice input device, a touch input device, a display, speakers, a camera, a microphone, a printer, and so forth, for receiving user input and/or providing output to a user.

The memory 164 may include various program modules comprising computer-executable instructions that upon execution by the processor(s) 162 may cause the various operations to be performed. For example, the memory 164 may have loaded therein an operating system (O/S) 172 that provides an interface between other application software executing on the database server and hardware resources of the database server. More specifically, the O/S 172 may include a set of computer-executable instructions for managing hardware resources of the database server and for providing common services to other application programs (e.g., managing memory allocation among various application programs). The O/S 172 may include any operating system now known or which may be developed in the future including, but not limited to, any desktop or laptop operating system, any mobile operating system, any mainframe operating system, or any other proprietary or freely available operating system. The memory 164 may further include a database management system (DBMS) 174 for accessing, retrieving, storing, and/or manipulating data stored in one or more databases (e.g., one or more of the databases 118). The DBMS 174 may use any of a variety of database models (e.g., relational model, object model, etc.) and may support any of a variety of query languages.

The memory 164 may further include various other program modules comprising computer-executable instructions that upon execution by the processor(s) 162 may cause various operations to be performed. For example, the memory 162 may include one or more server applications 176 that include computer-executable instructions for providing services to, for example, client applications interacting with the server application(s) 176. Such services may include storing information in or retrieving information from one or more of the databases 118.

Various program modules capable of supporting various types of functionality have been depicted with respect to the client computer 112, the connector database server 108, and the server system 102. This functionality will be described in more detail through reference to the process flow diagrams of FIGS. 2-5.

While illustrative techniques and methodologies of the disclosure have been described through reference to the illustrative architecture 100 depicted at varying levels of granularity in FIGS. 1A and 1B, it should be appreciated that numerous other configurations are possible for implementing the illustrative techniques and methodologies disclosed herein. Accordingly, embodiments of the disclosure are not limited to any particular architectural configuration.

Illustrative Processes

FIG. 2 is a process flow diagram of an illustrative method 200 for dynamically identifying and providing a connection string in accordance with one or more embodiments of the disclosure. One or more of the operations of the method 200 may be performed by the connector database server 108 and/or the connector module 114 using the connector database 116.

At block 202, one or more access credentials may be received by, for example, the connector database server 108 from the connector module 114 as part of an access request. Computer-executable instructions provided as part of, for example, the connector database access module 138 may be executed to identify the access credential(s) and provide the access credentials to the connector database server 108. As previously described, the access credentials may provide the connector module 114 with privileges to execute a stored procedure on the connector database 116 that enables dynamic identification of a connection string for establishing a connection between a client application (e.g., one of client application(s) 134) and a database server (e.g. the primary database server 104 or the standby database server 106 forming part of a server system 102). The stored procedure may be provided as part of, for example, the connection string identification module 160.

At block 204, access parameters may be received by the stored procedure from the connector module 114. Computer-executable instructions provided as part of, for example, the parameter identification module 132 may be executed to identify the access parameters. The access parameters may include, for example, a site identifier, an identifier associated with a client application, and potentially authentication credentials utilized to gain access to the client computer 112 or a domain or platform operating on the client computer 112 and in which a client application is executing. In certain embodiments, the connector module 114 may be configured to identify certain access parameters (e.g., a portion of the authentication credentials) via the O/S 130 of the client computer 112. More specifically, the connector module 114 may communicate a request to the O/S to identify the user name used to gain access to a domain or platform accessible via the client computer 112. In response, the O/S may identify the user name and provide the user name to the connector module 114. In this manner, the user is not required to provide authentication credentials to the connector module 114 outside of the context of the initial log-in event. Another advantage of this implementation is that it thwarts impersonation of the user as an illegitimate user cannot initiate a request for a connection string and perform transactions with a database server by supplying authentication credentials outside of the context of the initial log-in event. Yet another advantage of this implementation is that certain user authentication credentials (e.g., a user's password) are not made available to the connector module 114 thereby improving security.

At block 206, a connection string may be dynamically identified based at least in part on the access parameters received from the connector module 114. For example, the stored procedure provided as part of the connection string identification module 160 may be executed to identify a database server with which the client application desiring a connection is associated and to identify an associated connection string for establishing a connection between the client application and the identified database server. In various embodiments, identification of the connection string may include dynamic generation of the connection string.

At block 208, upon identification of the connection string, the connector database server 108 may transmit the connection string to the connector module 114. More specifically, in certain embodiments, the stored procedure may return the connection string, which may then be communicated to the connector module 114. In various embodiments, the connector module 114 may, using the connection string, facilitate establishment of a connection between the client application and the database server identified by the connection string. In other embodiments, such as those in which the connector module 114 is provided remotely to the client computer 112, the connector module 114 may communicate the connection string to the client application, which may, in turn, utilize the connection string to establish a connection with a database server identified by the connection string.

Figure 3:
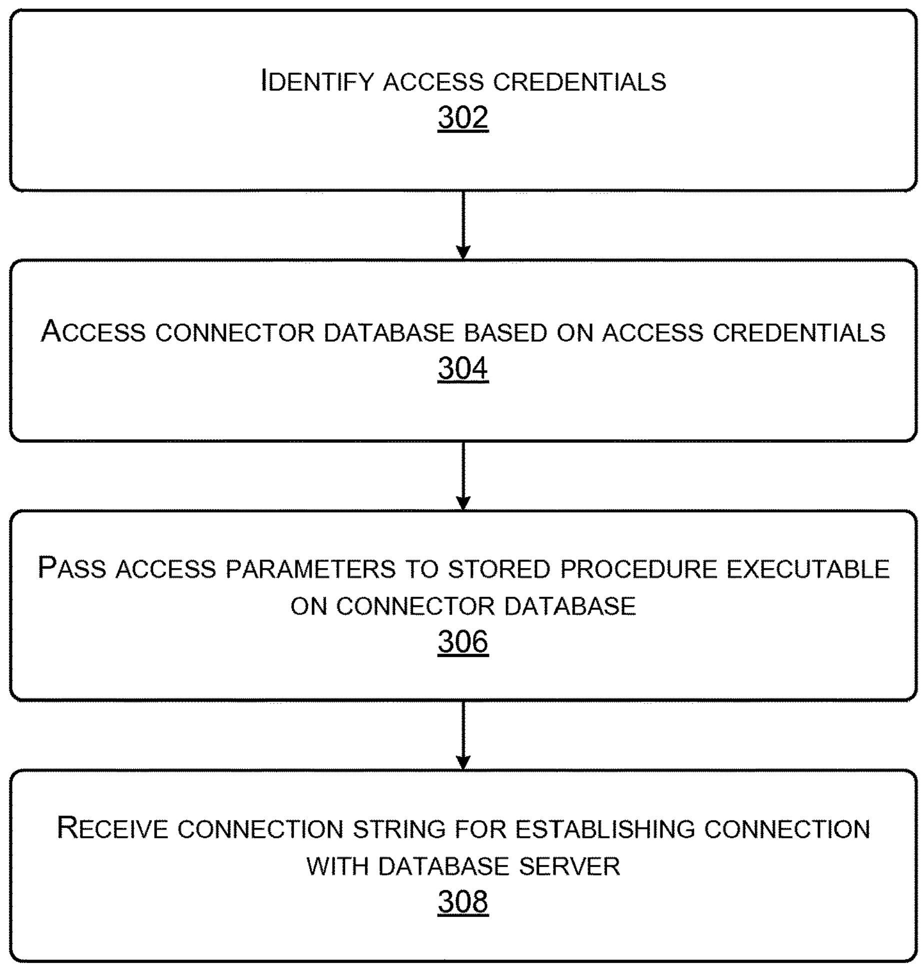
FIG. 3 is a process flow diagram of an illustrative method for dynamically fetching a connection string in accordance with one or more embodiments of the disclosure.

FIG. 3 is a process flow diagram of an illustrative method 300 for dynamically fetching a connection string in accordance with one or more embodiments of the disclosure. One or more of the operations of method 300 may be performed by the connector module 114.

At block 302, the connector module 114 may identify access credentials for accessing the connector database 116. For example, computer-executable instructions provided as part of the connector database access module 138 may be executed to identify the access credentials.

At block 304, the connector module 114 may access the connector database 116 based on the access credentials. In various embodiments, the connector module 114 may utilize the access credentials to establish a connection with the connector database server 108, and may thereby be provided with access to the connector database 116. The access credentials may provide the connector module 114 with privileges to execute a stored procedure on the connector database 108.

At block 306, the connector module 114 may pass access parameters to the stored procedure that is executable on the connector database 116. Computer-executable instructions provided as part of, for example, the parameter identification module 136 may be executed to identify the access parameters and transmit the parameters to the stored procedure executable on the connector database 116.

At block 308, the connector module 114 may receive a connection string for establishing a connection between the client application identified by an access parameter and a database server identified by the connection string. The connection string may be returned by the stored procedure and may be provided to the connector module 114 by the connector database server 108. The connector module 114 may then, using the connection string, facilitate establishment of a connection between the client application and the database server identified by the connection string.

Although not depicted as part of the operations of the illustrative methods 200 and 300, the connector module 114 may be configured to monitor use of the access credentials to determine if they have potentially been compromised. For example, computer-executable instructions provided as part of the monitoring and alert generation module 140 may be executed to generate monitoring data associated with use of the access credentials. If it is determined, based on the monitoring data, that the access credentials stored in or otherwise provided in association with the connector module 114 are compromised, such access credentials may be modified. Because the access credentials provide privileges for executing a stored procedure or other subroutine on the connector database 116 and dynamically fetching an associated connection string, but do not permit access to other connection strings stored in the connector database, security is enhanced in accordance with embodiments of the disclosure.

Monitoring data generated, upon execution of computer-executable instructions provided as part of the monitoring and alert generation module 140 for example, may be analyzed to determine whether the data is indicative of abnormal activity patterns that may indicate that authentication credentials used to access a computing device, domain or platform on which a client application is executing have been compromised. If it is determined that such authentication credentials have potentially been compromised, access requests associated with those authentication credentials may be denied. For example, the connector database 116 may prohibit the fetching of connection strings for access requests associated with authentication credentials determined to have been compromised.

In addition, in certain embodiments, the connector module 114 may be configured to generate event data associated with one or more events. For example, computer-executable instructions provided as part of the event generation module 142 may be executed to generate the event data. The one or more events may include, for example, one or more database accesses by a client application connected to a database server. The database accesses may include, for example, SQL statements executed on database(s) associated with the database server. The event data may be utilized by other client applications in any suitable manner such as, for example, to generate report data.

In addition, in certain embodiments, the connector module 114 may be configured to facilitate establishment of a connection between a client application and a database server for purposes of testing application functionality associated with the client application. For example, computer-executable instructions provided as part of the parameter identification module 136 may be executed to identify that a client application has been invoked with a parameter having a predetermined association with a particular test database server. Upon identifying this parameter, the connector module 114 may proceed to facilitate establishment of a connection between the client application and the test database server. In certain embodiments, the connector module 114 may have privileges for executing a stored procedure on the connector database 116 that accepts the parameter as input and generates a connection string for establishing a connection with the test database server. The connection string may be provided to the connector module 114 which may, in turn, facilitate establishment of the connection.

Figure 4:
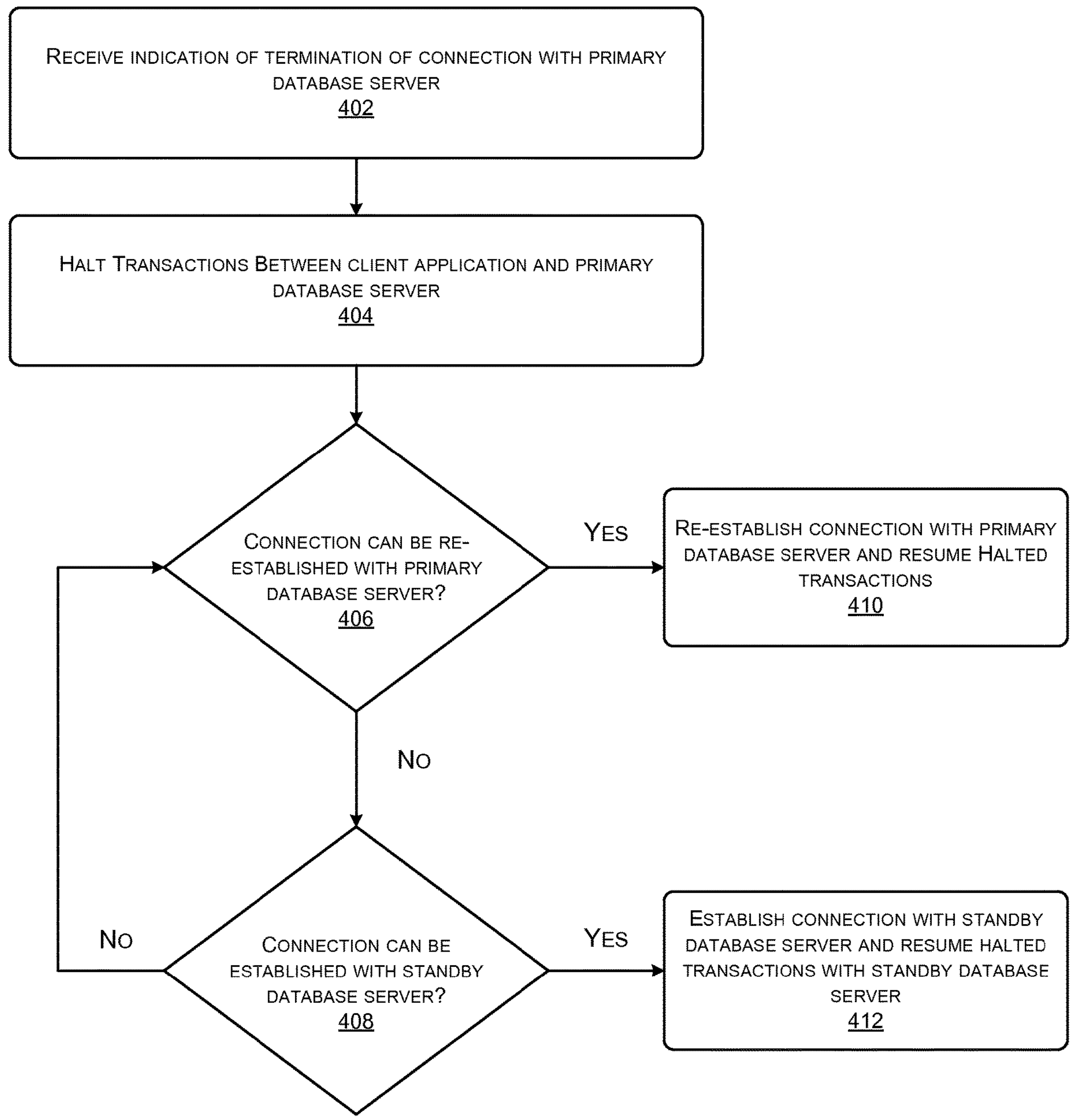
FIG. 4 is a process flow diagram of an illustrative method for providing fallback capability in accordance with one or more embodiments of the disclosure.

FIG. 4 is a process flow diagram of an illustrative method 400 for providing fallback capability in accordance with one or more embodiments of the disclosure. One or more of the operations of method 400 may be performed, in various embodiments, by the connector module 114, or more specifically, upon execution of computer-executable instructions provided as part of, for example, the switchover condition determination module 144.

A connection may be established between a primary database server and a client application based, for example, on a connection string dynamically fetched via the connector database 116 as described above. At block 402, the connector module 114 may receive an indication of a termination of a connection between the client application and the primary database server. The connection may be terminated based, for example, on a failure or fault condition associated with the primary database server, maintenance being performed on the primary database server, and so forth.

At block 404, upon receipt of this indication, the connector module 114 may halt pending transactions between the client application and the primary database server. The connector module 114 may then periodically poll the primary database server in order to make a determination at block 406 as to whether a connection may be re-established between the client application and the primary database server. If the connector module 114 determines, at block 406, that the connection with the primary database server may be re-established, the method 400 may proceed to block 410 and the connection between the client application and the primary database server may be re-established and halted transactions may be resumed with the primary database server.

If, on the other hand, the connector module 114 determines, at block 406, that a connection cannot be re-established with the primary database server, the connector module 114 may poll the standby database server in order to make a determination, at block 408, as to whether a connection can be established between the client application and the standby database server. If the connector module determines, at block 408, that a connection can be established between the client application and the standby database server, the method 400 may proceed block 412 where the connector module 114 may facilitate establishment of the connection between the client application and the standby database server and may resume the previously halted transactions with the standby database server instead of the primary database server. If, on the other hand, a determination is made, at block 408, that a connection cannot be established with the standby database server, the method 400 may proceed once again to block 406 and the connector module may again poll the primary database server. The polling of the primary database server may occur at any suitable interval.

The determination as to whether a connection can be established between a client application and a particular database server may be based at least in part on an indicator stored on the database server and/or whether an attempted connection with the database server times out. For example, upon polling a database server, a stored procedure provided on the database server may be executed. The stored procedure may return a Boolean value indicating whether a connection can be established with the database server. Alternatively, if a database server is polled and the connection times out after some period of time, this may indicate that the database server is not available. For example, a determination at block 406 that the connection cannot be re-established with the primary database server may be based on a timing out of an attempted connection indicating that the connection with the primary database server cannot be established. Further, a determination, at block 408, that a connection can be established with the standby database server may be based on the stored procedure on the standby database server returning a Boolean value (e.g., a Boolean true) indicating that a connection can be established with the standby database server, and in this manner, the standby database server may be designated to serve (at least temporarily) as the primary database server. If the primary database server is unavailable for connection, the stored procedure on the standby database server may be modified to return an indicator (e.g., a Boolean true value) thereby indicating that the standby database server has been designated to act as a proxy for the primary database server.

Figure 5:
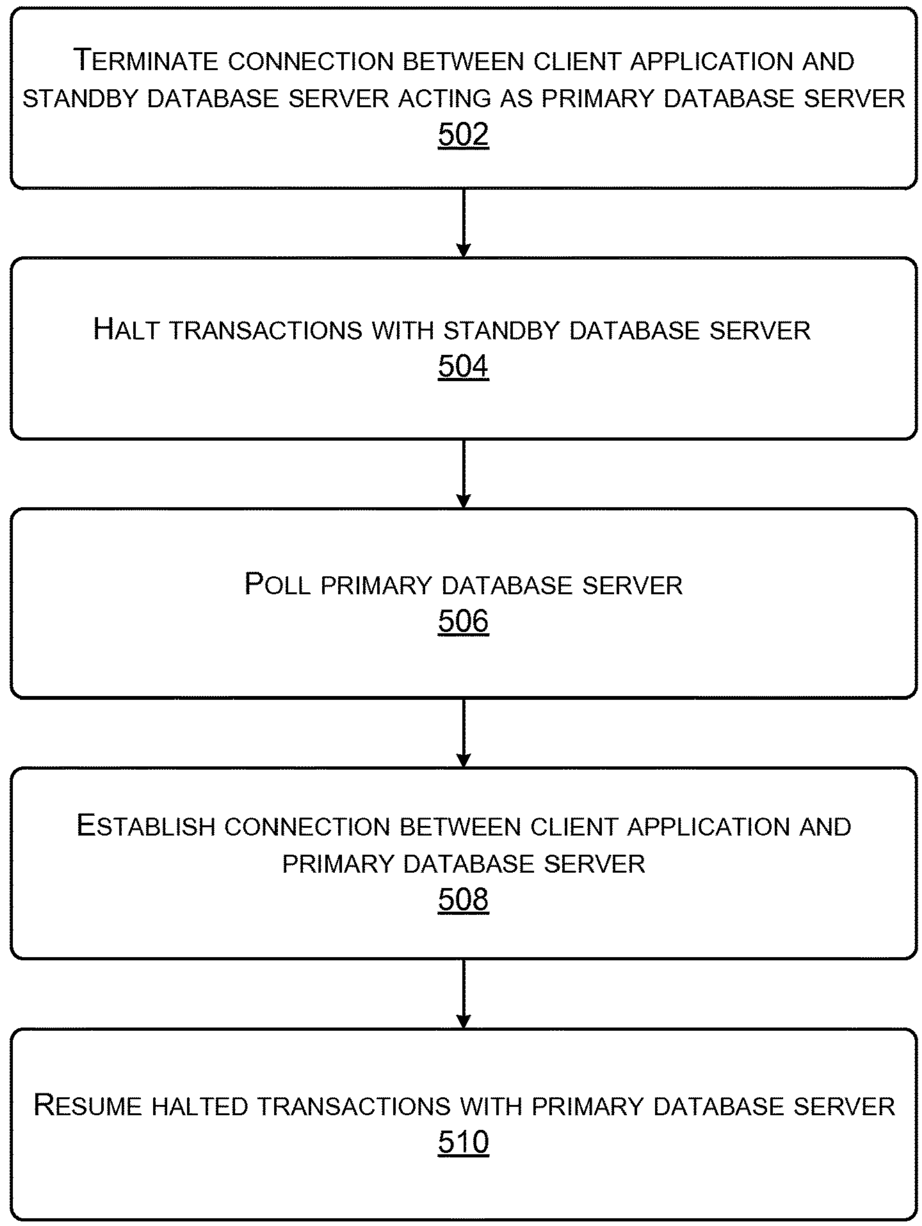
FIG. 5 is a process flow diagram of an illustrative method for re-establishing a connection with a primary database server and resuming halted transactions in accordance with one or more embodiments of the disclosure.

FIG. 5 is a process flow diagram of an illustrative method 500 for re-establishing a connection with a primary database server and resuming halted transactions in accordance with one or more embodiments of the disclosure. One or more of the operations of method 500 may be performed, in various embodiments, by the connector module 114, or more specifically, upon execution of computer-executable instructions provided as part, for example, the switchover condition determination module 144.

At block 502, the connector module 114 may terminate a connection between a client application and a standby database server acting as a primary database server. In other embodiments, the connection between the client application and the standby database server may be terminated by the standby database server. For example, the standby database server may be configured to terminate the connection if the primary database server has again become available for connection. At block 504, the connector module 114 may halt any open transactions between the client application and the standby database server. At block 506, the connector module 114 may poll the primary database server to determine if a connection between the client application and the primary database server can once again be re-established. If the primary database server is once again returned to a functioning or available state, the Boolean value returned by the stored procedure provided on the primary database server may return a value (e.g., a Boolean true) indicating that a connection can once again be established with the primary database server. The method 500 may then proceed block 508, and the connection between the client application and the primary database server may be re-established. At block 510, upon re-establishing the connection with the primary database server, the halted transactions may be resumed with the primary database server instead of the standby database server. The fallback capability provided by the connector module 114 described through reference to the process flow diagrams of FIGS. 4 and 5 provides an advantage of allowing open transactions between a client application and a database server to be halted and resumed without having to abort the transactions.

Although specific embodiments of the disclosure have been described with respect to various illustrative functionality, examples and use cases, one of ordinary skill in the art will recognize that numerous other modifications and alternative embodiments are within the scope of the disclosure. For example, any of the functionality and/or processing capabilities described as being supported by a particular device or component may be supported or performed by any other device or component.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program modules, or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A method, comprising:

receiving, by one or more processors, an indication of termination of a connection between a client application and a first database system;

halting a pending transaction between the client application and the first database system;

determining, one or more access credentials for accessing the first database system;

accessing the first database system based at least in part on the one or more access credentials;

determining an access parameter associated with a client application, the access parameter for testing the client application, the client application executing on a computing device;

sending the access parameter to the first database system;

sending a plurality of access parameters for accessing a second database system, wherein the plurality of access parameters comprise a first identifier representing a location associated with the computing device and a second identifier representing the client application;

sending the plurality of access parameters to a stored procedure on the first database system;

determining that a first access credential of the one or more access credentials has been compromised;

accessing, using the first access credential, the first database system;

executing, using the first access credential, the stored procedure to generate first connection string data, wherein the first connection string data causes communications between the client application and the second database system to be rejected;

modifying the first access credential that has been compromised;

receiving a request to access the first database system using the modified first access credential;

rejecting, by the first database system, the request to access the first data system;

accessing, using a second access credential of the one or more access credentials, the first database system;

generating second connection string data using the stored procedure and the second access credential, wherein the second connection string data at least partially enables the client application to communicate with the second database system;

sending the second connection string data to the client application, wherein the communications between the client application and the second database system are sent based at least in part on the second connection string data;

resuming the pending transaction, wherein the pending transaction is resumed between the client application and the second database system;

receiving an indication of a termination of the connection between the client application and the second database system; and polling the first database system periodically at a predetermined interval.

2. The method of claim 1, wherein generating the second connection string data using the stored procedure comprises:

executing the stored procedure on the first database system.

3. The method of claim 1, wherein the second database system is associated with a geographical region with which the location is associated.

4. The method of claim 1, further comprising receiving third connection string data associated with the second access credential of the one or more access credentials that at least partially enables the client application to communicate with a testing database system; and sending the third connection string data to the client application, wherein a connection between the client application and the testing database system is sent based at least in part on the third connection string data.

5. The method of claim 1, further comprising:

identifying one or more events associated with the communications between the client application and the second database system;

generating monitoring data associated with the one or more events, wherein the monitoring data comprises data identifying one or more data requests received by the second database system from the client application; and sending at least a portion of the monitoring data to one or more additional client applications executing on the computing device.

6. A method, comprising:

receiving, by a first database system comprising one or more database servers comprising one or more processors, an indication of termination of a connection between a client application and the first database system;

halting a pending transaction between the client application and the first database system;

receiving, from a connector component executing on a computing device, an access request comprising one or more access credentials for accessing the first database system;

receiving, by the first database system, a parameter for testing a client application;

receiving one or more access parameters for accessing a second database system, wherein the one or more access parameters are associated with the access request, wherein the one or more access parameters comprise a first identifier representing the client application executing on the computing device and a second identifier representing a location associated with the computing device, wherein the connector component is in communication with the client application;

sending the one or more access parameters to a stored procedure on the first database system;

determining that a first access credential of the one or more access credentials has been compromised;

accessing, using the first access credential, the first database system;

executing, using the first access credential, the stored procedure to generate first connection string data, wherein the first connection string data causes a communication between the client application and the second database system to be rejected;

modifying the first access credential that has been compromised;

receiving a request to access the first database system using the modified first access credential;

rejecting, by the first database system, the request to access the first data system;

accessing, using a second access credential, the first database system;

generating, using the stored procedure, second connection string data associated with a second access credential of the one or more access credentials, wherein the second connection string data at least partially enables the client application to communicate with the second database system;

sending the second connection string data, wherein the communication between the client application and the second database system is based at least in part on the second connection string data;

identifying, based at least in part on the one or more access parameters and the second access credential, third connection string data that at least partially enables the client application to communicate with a testing database system;

sending the third connection string data to the connector component, wherein communications between the client application and the testing database system are based at least in part on the third connection string data;

resuming the pending transaction, wherein the pending transaction is resumed between the client application and the second database system;

receiving an indication of a termination of the connection between the client application and the second database system; and polling the first database system periodically at a predetermined interval.

7. The method of claim 6, further comprising:

determining the second database system based at least in part on the one or more access parameters.

8. The method of claim 6, further comprising:

retrieving a plurality of additional connection string data, wherein each of the plurality of additional connection string data is associated with a respective additional access request comprising the one or more access credentials and the one or more access parameters, and wherein each of the plurality of additional connection string data at least partially enables the client application to communicate with the second database system.

9. The method of claim 8, wherein the one or more access parameters further comprise a third identifier associated with a user of the client application, the method further comprising:

generating, monitoring data associated with at least a portion of a plurality of additional access requests;

analyzing the monitoring data to identify an abnormal access pattern associated with the at least the portion of the plurality of additional access requests;

determining based at least in part on the abnormal access pattern, that the third identifier has been compromised; and rejecting based at least in part on the determining that the third identifier has been compromised, a subsequent access request associated with the third identifier.

10. The method of claim 9, wherein the rejecting the subsequent access request comprises:

receiving, from the connector component, the subsequent access request, wherein the subsequent access request comprises the one or more access credentials;

receiving, from the connector component, the one or more access parameters; and determining, based at least in part on the determining that the third identifier has been compromised, that fourth connection string data associated with the subsequent access request should not be sent to the connector component.

11. The method of claim 6, further comprising:

identifying an abnormal access pattern associated with receipt of the one or more access credentials;

determining, based at least in part on the abnormal access pattern, that the one or more access credentials have been compromised;

modifying based at least in part on determining that the one or more access credentials have been compromised, the one or more access credentials to generate one or more modified access credentials; and sending to the client application, the one or more modified access credentials.

12. The method of claim 6, further comprising:

generating the second connection string data responsive to receiving the one or more access parameters.

13. The method of claim 6, wherein the client application is configured to communicate with the second database system using the second connection string data.

14. A system, comprising:

one or more servers comprising:

at least one processor; and at least one memory storing computer-executable instructions, wherein the at least one processor is configured to access the at least one memory and to execute the computer-executable instructions to:

receive an indication of termination of a connection between a client application and a first database system;

halt a pending transaction between the client application and the first database system;

receive, from a program component executing on a computing device, an access request comprising one or more access credentials for accessing a first database system;

receive, in association with the access request, a plurality of access parameters for accessing a second database system, wherein the plurality of access parameters comprises a first identifier representing a client application executing on the computing device and a second identifier representing a location associated with the computing device;

send the plurality of access parameters to a stored procedure;

determine that a first access credential of the one or more access credentials has been compromised;

access, using the first access credential, the first database system;

execute, using the first access credential, the stored procedure to generate first connection string data, wherein the first connection string data causes a communication between the client application and the second database system to be rejected;

modify the first access credential that has been compromised;

receive a request to access the first database system using the modified first access credential;

reject, by the first database system, the request to access the first data system;

access, using a second access credential, the first database system;

generate, using the stored procedure, second connection string data associated with the second access credential of the one or more access credentials that at least partially enables the client application to communicate with the second database system;

receive, from the program component, a parameter for testing the client application;

identify, based at least in part on the parameter, third connection string data that at least partially enables the client application to communicate with a testing database system;

send the second connection string data to the program component, wherein the communication between the client application and the second database system is based at least in part on the second connection string data;

send the third connection string data to the program component, wherein communications between the client application and the testing database system are based at least in part on the third connection string data;

resume the pending transaction, wherein the pending transaction is resumed between the client application and the second database system;

receive an indication of a termination of the connection between the client application and the second database system; and poll the first database system periodically at a pre-determined interval.

15. The system of claim 14, wherein the at least one processor is further configured to access the at least one memory and to execute the computer-executable instructions to:

execute, on a database, the stored procedure that receives the plurality of access parameters as input to return the second connection string data, and receive the second connection string data as an execution result of the stored procedure.

16. The system of claim 14, wherein, to generate the second connection string data, the at least one processor is configured to access the at least one memory and to execute the computer-executable instructions to:

determine the second database system based at least in part on the plurality of access parameters, and dynamically generate the second connection string data responsive to determining the second database system.

17. At least one non-transitory computer-readable medium comprising computer-executable instructions that responsive to execution by at least one processor configures the at least one processor to perform operations comprising:

receiving an indication of termination of a connection between a client application and a primary database server;

halting a pending transaction between the client application and the primary database server;

establishing a connection between the client application and a standby database server, wherein establishing the connection comprises:

receiving, an access request comprising one or more access credentials for accessing a first database system;

determining that a first access credential of the one or more access credentials has been compromised;

accessing, using the first access credential, the first database system;

executing, using the first access credential, a stored procedure on the first database system to generate first connection string data, wherein the first connection string data causes communication between the client application and the standby database server to be rejected;

modifying the first access credential that has been compromised;

receiving a request to access the first database system using the modified first access credential;

rejecting, by the first database system, the request to access the first data system;

accessing, using a second access credential, the first database system; and generating, using the stored procedure, second connection string data associated with the second access credential of the one or more access credentials that at least partially enables the client application to communicate with the standby database server;

resuming the pending transaction, wherein the pending transaction is resumed between the client application and the standby database server;

receiving an indication of a termination of the connection between the client application and the standby database server; and polling the primary database server periodically at a pre-determined interval.

18. The at least one non-transitory computer-readable medium of claim 17, the operations further comprising:

determining that the connection between the client application and the primary database server is available based at least in part on the polling; and re-establishing the connection between the client application and the primary database server.

19. The at least one non-transitory computer-readable medium of claim 17, wherein the indication of termination of the connection between the client application and the primary database server is received based at least in part on a fault condition associated with the primary database server.

20. The at least one non-transitory computer-readable medium of claim 17, the operations further comprising executing a stored procedure on the standby database server and receiving an indication that the standby database server has been designated to serve as a proxy for the primary database server.

21. The at least one non-transitory computer-readable medium of claim 20, wherein the indication comprises a Boolean value returned by the stored procedure on the standby database server.

* * * * *